United States Patent
Joseph et al.

(10) Patent No.: US 9,298,957 B2
(45) Date of Patent: Mar. 29, 2016

(54) DETECTING WINDOW DETERIORATION ON BARCODE SCANNING WORKSTATION

(71) Applicant: SYMBOL TECHNOLOGIES, INC., Schaumburg, IL (US)

(72) Inventors: Eugene B Joseph, Coram, NY (US); Duanfeng He, South Setuaket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/447,798

(22) Filed: Jul. 31, 2014

(65) Prior Publication Data

US 2016/0034722 A1    Feb. 4, 2016

(51) Int. Cl.
G06K 7/10    (2006.01)
G06K 7/00    (2006.01)
H04N 1/409   (2006.01)
H04N 1/00    (2006.01)

(52) U.S. Cl.
CPC .......... G06K 7/0095 (2013.01); H04N 1/00029 (2013.01); H04N 1/4097 (2013.01)

(58) Field of Classification Search
CPC ............ G06K 7/0095; G06K 7/10851; H04N 1/00029; H04N 1/00053; H04N 1/4097
USPC ......................................................... 235/454
See application file for complete search history.

(56) References Cited

U.S. PATENT DOCUMENTS

| | | | |
|---|---|---|---|
| 5,214,470 A * | 5/1993 | Denber | 355/75 |
| 5,440,142 A | 8/1995 | Maddox | |
| 5,930,008 A * | 7/1999 | Nabeshima | H04N 1/04 355/52 |
| 6,219,438 B1 * | 4/2001 | Giordano et al. | 382/110 |
| 6,755,653 B2 | 6/2004 | Varshneya | |
| 7,702,236 B2 * | 4/2010 | Steinberg | G06T 7/0008 348/180 |
| 7,830,563 B2 | 11/2010 | Aoki | |
| 8,002,184 B1 | 8/2011 | Drzymala et al. | |
| 8,464,951 B2 | 6/2013 | Trajkovic et al. | |
| 2003/0035153 A1 * | 2/2003 | Lin | 358/487 |
| 2005/0068450 A1 * | 3/2005 | Steinberg et al. | 348/335 |
| 2008/0267537 A1 * | 10/2008 | Thuries | 382/321 |
| 2010/0147953 A1 | 6/2010 | Barkan | |
| 2011/0101099 A1 * | 5/2011 | Trajkovic et al. | 235/454 |
| 2014/0061305 A1 * | 3/2014 | Nahill et al. | 235/438 |
| 2015/0330913 A1 * | 11/2015 | Heskee, III | G01N 21/94 356/239.8 |

OTHER PUBLICATIONS

Interntionl Search Report and Written Opinion mailed Sep. 14, 2015 in counterpart PCT application PCT/US2015/040740.

* cited by examiner

*Primary Examiner* — Thien M Le
*Assistant Examiner* — Claude J Brown
(74) *Attorney, Agent, or Firm* — Nong-Qiang Fan

(57) ABSTRACT

A method of operating a workstation includes capturing multiple monitoring images each being captured with the imaging sensor while the illumination light source is energized during one of multiple short exposure-time-periods, and detecting a checkup-condition that includes analyzing the multiple monitoring images to determine the presence of any adverse feature on workstation's window. Each of the multiple short exposure-time-periods is shorter than four times of a threshold exposure-time-period but no shorter than 25% of the threshold exposure-time-period. The threshold exposure-time-period is a minimal exposure-time-period needed for the imaging sensor to capture recognizable patterns of a barcode that is in directing contacting with the window while the illumination light source is energized.

14 Claims, 12 Drawing Sheets

DETECTING WINDOW DETERIORATION ON BARCODE SCANNING WORKSTATION

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

Imaging-based bar code readers may be portable or stationary. A portable bar code reader is one that is adapted to be held in a user's hand and moved with respect to target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to be swiped.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
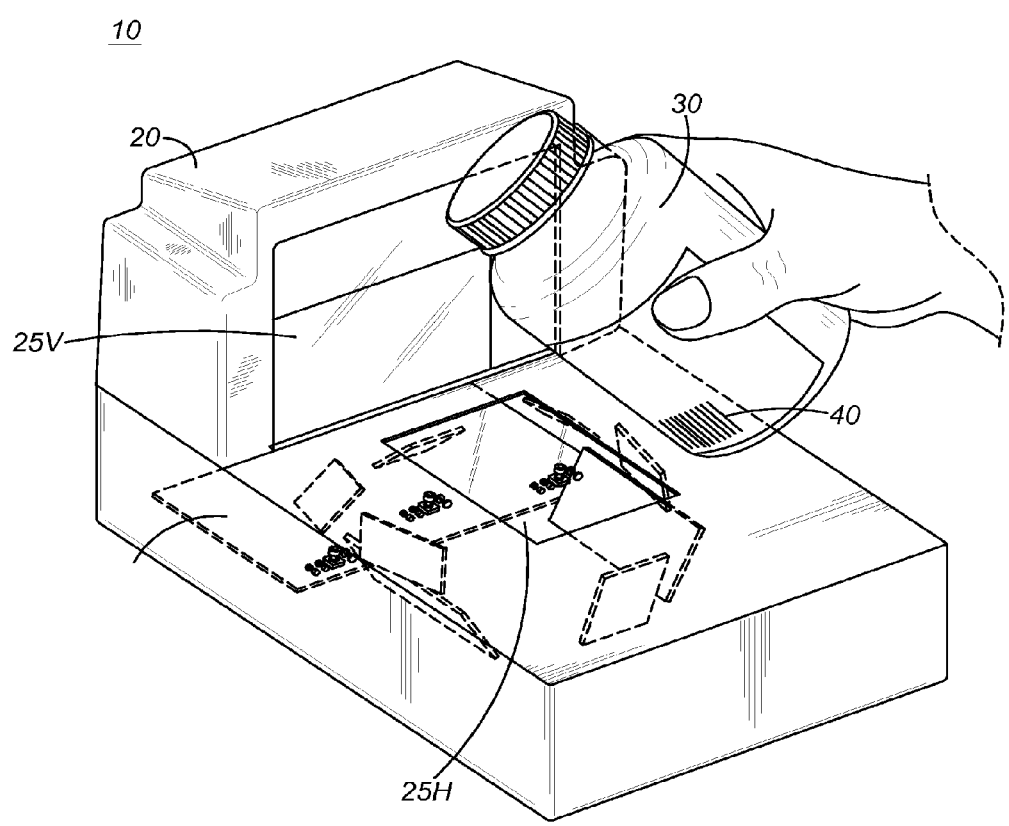
FIG. 1 depicts a workstation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of operating a workstation having an imaging sensor located within a housing. The housing has a first window in an upright plane and a second window in a generally horizontal plane that intersects the upright plane. The workstation has two modes of operation including a normal mode of operation and a monitoring mode of operation. The method includes projecting illumination light through one of the windows by energizing an illumination light source within the housing, intended for capturing at least one image with the imaging sensor. The method also includes capturing multiple monitoring images each being captured with the imaging sensor while the illumination light source is energized during one of multiple short exposure-time-periods associated with the monitoring mode of operation, and detecting a checkup-condition including analyzing the multiple monitoring images to determine the presence of at least one image of an adverse feature on said one of the windows. The adverse feature can be a piece of dirt, a scratch mark, or a spill mark. In the method, each of the multiple short exposure-time-periods is shorter than four times of a threshold exposure-time-period but no shorter than 25% of the threshold exposure-time-period. The threshold exposure-time-period is a minimal exposure-time-period needed for the imaging sensor to capture recognizable patterns of a barcode that is in directing contacting with said one of the windows while the illumination light source is energized.

FIG. 1 depicts a workstation 10 in accordance with some embodiments. The workstation 10 is stationary and includes a housing 20. The housing 20 has a generally horizontal window 25H and a generally vertical window 25V. In one implementing, the housing 20 can be integrated into the sales counter of a point-of-transaction system. The point-of-transaction system can also includes a cash register 48, a touch screen visual display, a printer for generating sales receipts, or other type user interface. The workstation often includes weighing scale 46 incorporated within the housing 20. A horizontal platter 26 is coupled with the weighing scale 46 for weighing a product placed on the horizontal platter 26. The workstation 10 can be used by retailers to process transactions involving the purchase of products bearing an identifying target, such as UPC symbols.

In accordance with one use, an operator can slide or swipe the product 30 past one of the windows (e.g., 25H or 25V) from right to left, or from left to right, in a "swipe" mode, to let an image of the barcode 40 on the product 30 be captured by the workstation 10. Alternatively, the operator can present the barcode 40 on the product 30 to the center of the vertical window 25V in a "presentation" mode. The choice depends on operator preference or on the layout of the workstation. Upon a successful reading of the target bar code, a visual and/or audible signal will be generated by the workstation 10 to indicate to the user that the barcode 40 has been successfully imaged and decoded.

Figure 2A:
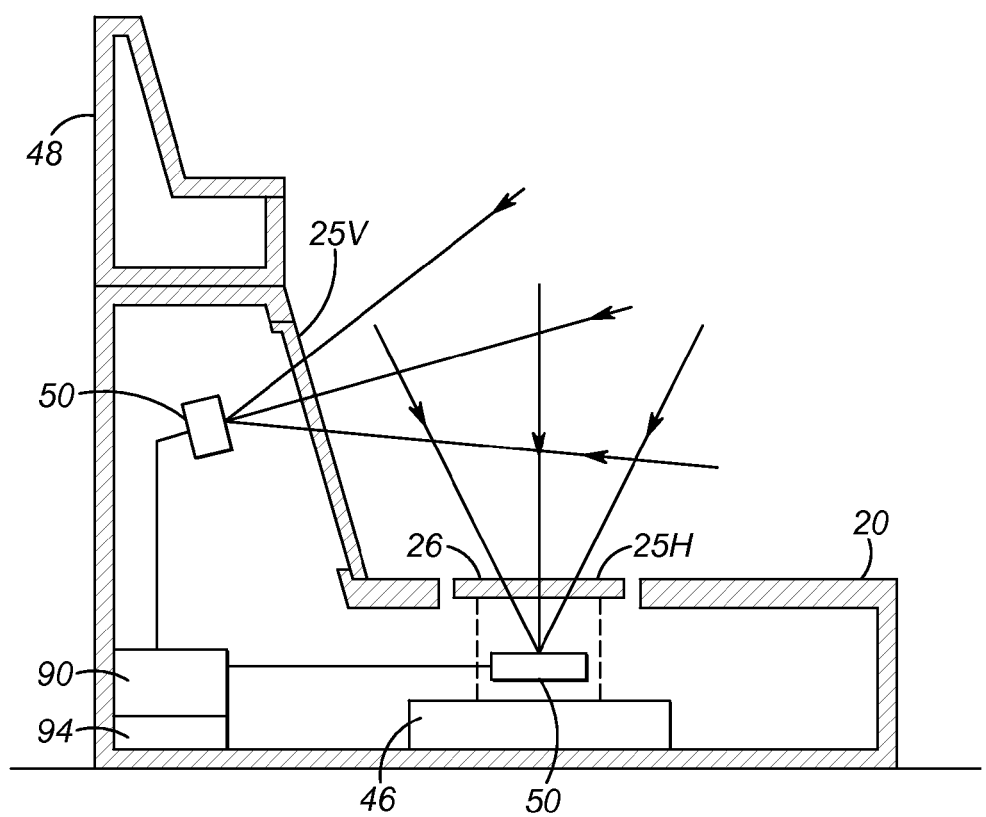
FIG. 2A is a schematic of a multi-planer workstation that includes a plurality of solid-state imagers in accordance with some embodiments.
Figure 2B:
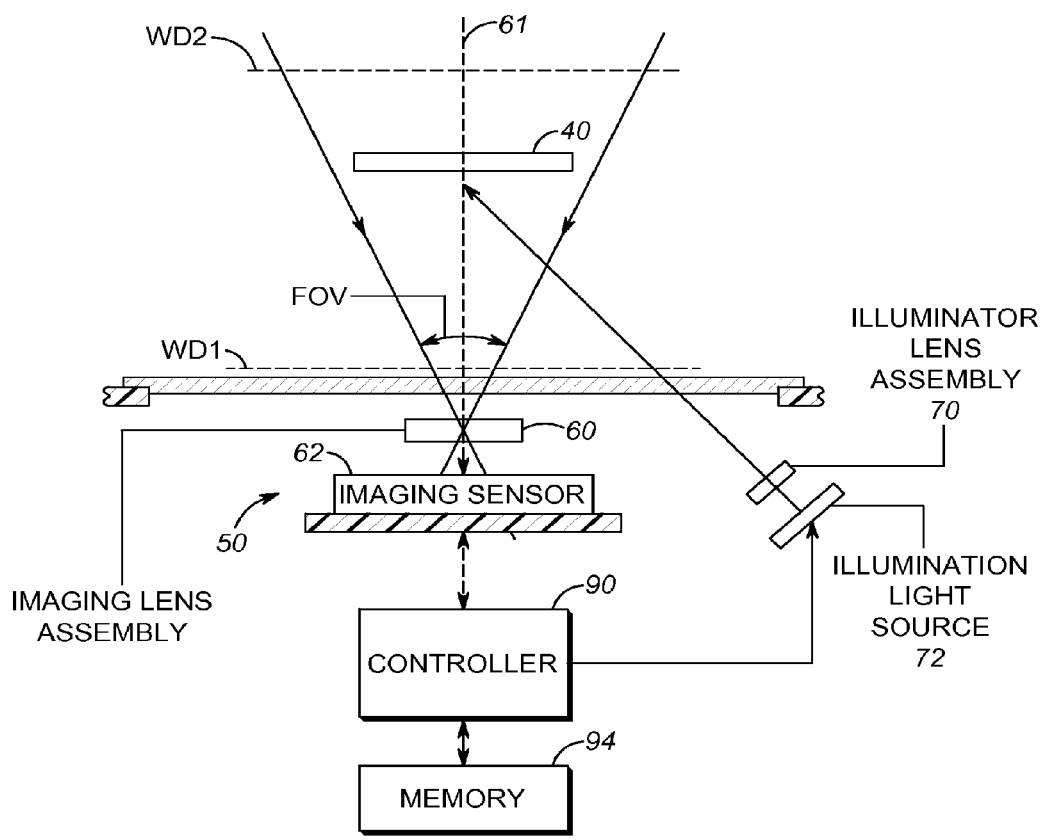
FIG. 2B is a schematic of an imaging scanner in accordance with some embodiments.

As schematically shown in FIG. 2A, a plurality of imaging scan engines 50 are mounted at the workstation 10, for capturing light passing through either or both windows from a target which can be a one- or two-dimensional symbol, such as a two-dimensional symbol on a driver's license, or any document, as described below. FIG. 2B is a schematic of an imaging scan engine 50 in accordance with some embodiments. The imaging scan engine 50 in FIG. 2B includes the following components: (1) an imaging sensor 62 positioned behind an imaging lens arrangement 60; (2) an illuminating lens arrangement 70 positioned in front of an illumination light source 72; and (3) a controller 90.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 25H (or 25V). Generally, the imaging sensor 62 and the imaging lens arrangement 60 are designed to operate together for capturing light scattered or reflected from a barcode 40 as image data over a two-dimensional imaging field of view (FOV). The barcode 40 generally can be located anywhere in a working range of distances between a close-in working distance (WD1) and a far-out working distance (WD2).

In FIG. 2B, the illuminating lens arrangement 70 and the illumination light source 72 are designed to operate together for generating an illuminating light towards the barcode 40 during an illumination time period. The illumination light source 72 can include one or more light emitting diodes (LED). The illumination light source 72 can also include a laser or other kind of light sources. In some implementations, the imaging scan engine 50 can have more than one illumination arrangement.

In FIG. 2B, the controller 90, such as a microprocessor, is operatively connected to the imaging sensor 62 and the illumination light source 72 for controlling the operation of these components. The controller 90 can also be used to control other devices in the imaging scanner. The workstation 10 includes a memory 94 that can be accessible by the controller 90 for storing and retrieving data. In many embodiments, the controller 90 also includes a decoder for decoding one or more barcodes that are within the imaging field of view (FOV) of the imaging scan engine 50. In some implementations, for example, as shown in FIG. 2A, the controller 90 can be used for controlling multiple scanner engines 50. In some implementations, the barcode 40 can be decoded by digitally processing a captured image of the barcode with a microprocessor.

In operation, in accordance with some embodiments, the controller 90 sends a command signal to energize the illumination light source 72 for a predetermined illumination time period. The controller 90 then exposes the imaging sensor 62 to capture an image of the barcode 40. The captured image of the barcode 40 is transferred to the controller 90 as image data. Such image data is digitally processed by the decoder in the controller 90 to decode the barcode. The information obtained from decoding the barcode 40 is then stored in the memory 94 or sent to other devices for further processing.

The illumination light source 72 usually is energized to address low ambient light conditions and to minimize effect of object motion on reading performance. On the other hand having bright illumination of an imaging scanner in constantly on state is annoying and bothersome for the user. It is also not efficient from power management perspective. Therefore it is beneficial to have an object sensing system which energizes illumination system only if the object of interest is presented within the predetermined FOV of the imaging scanner and at a certain distance from the scanner. The object detecting system usually includes an infrared LED and a photodetector. When an object is presence in an object field of view of the object detecting system, light projected upon such object will be reflected and scattered back towards the object detecting system, and the reflected and scattered light will be detected by the photodetector of the object detecting system.

As previously stated, FIG. 2A is only a schematic representation of an all imager-based workstation as embodied in a bi-optical workstation with two windows. The workstation can have other kinds of housings with different shapes. The workstation can have one window, two windows, or with more than two windows. In some embodiments, the workstation can include between three to six solid-state imagers. The bi-optical workstation can also include more than six solid-state imagers.

A bi-optical workstation often have multiple subfields of views each provides optimum visibility of a target barcode on the various sides of the product 30 being passed through the scan zone. For examples, FIGS. 3A-3F shows bi-optical workstation that has six subfields of views in accordance with some embodiments. The six subfields are oriented to be most effective for reading indicia on products oriented in the most common ways presented to the workstation by users. The six subfields provide redundant coverage for the indicia located in common positions on the products, thereby assuring maximum performance when used by typical users.

Figure 3A:
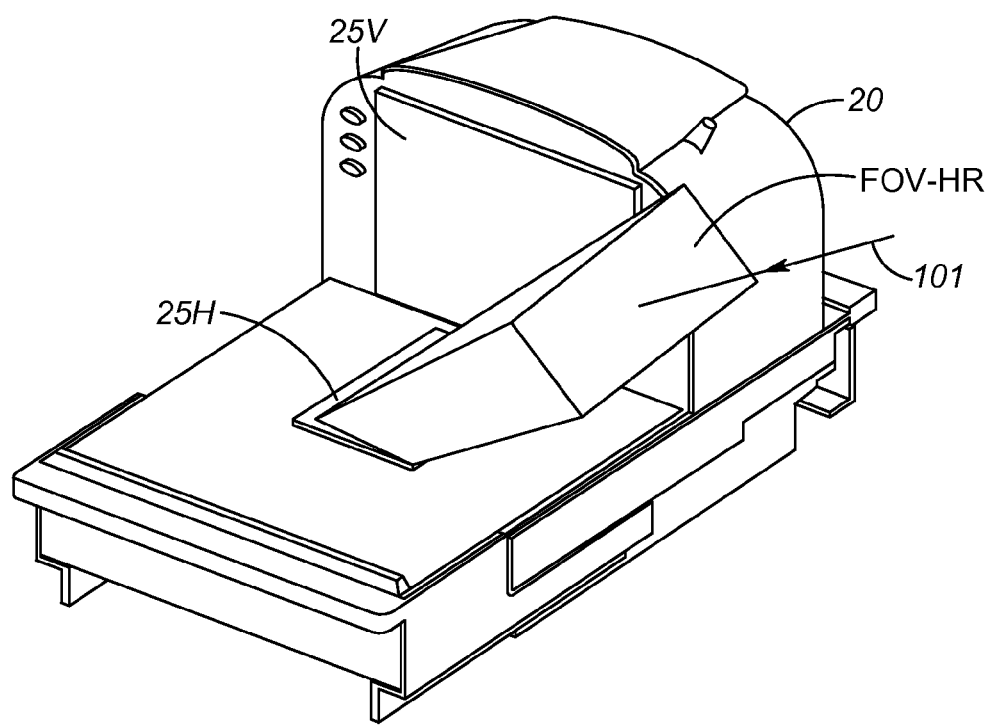
FIGS. 3A-3F shows bi-optical workstation that has six subfields of views in accordance with some embodiments.
Figure 3B:
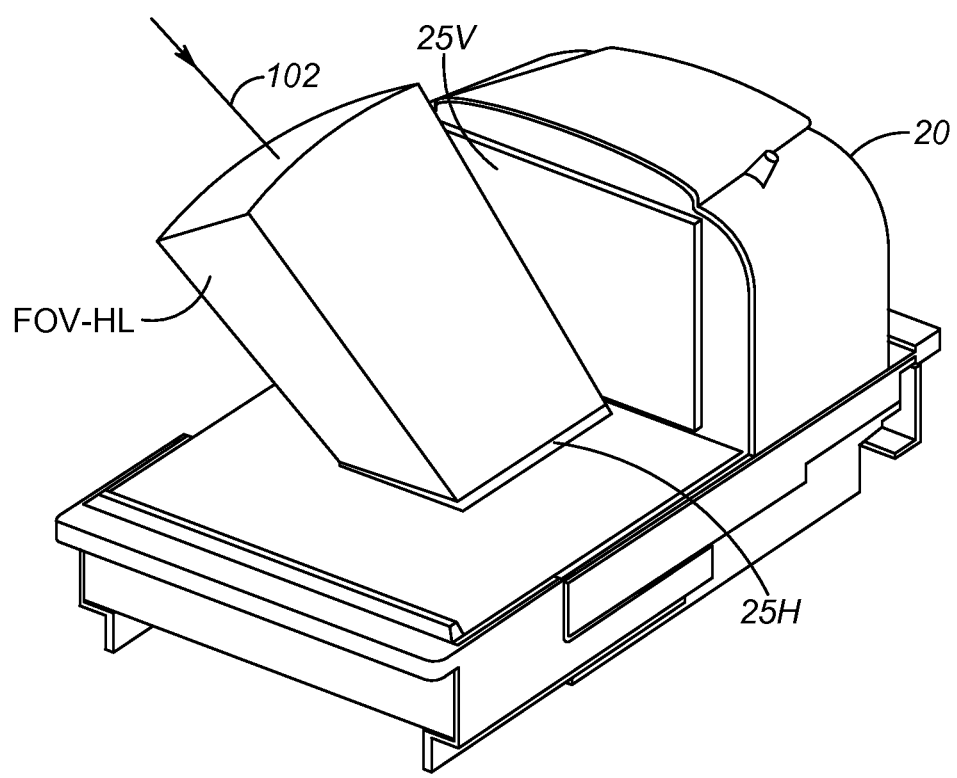
Figure 3C:
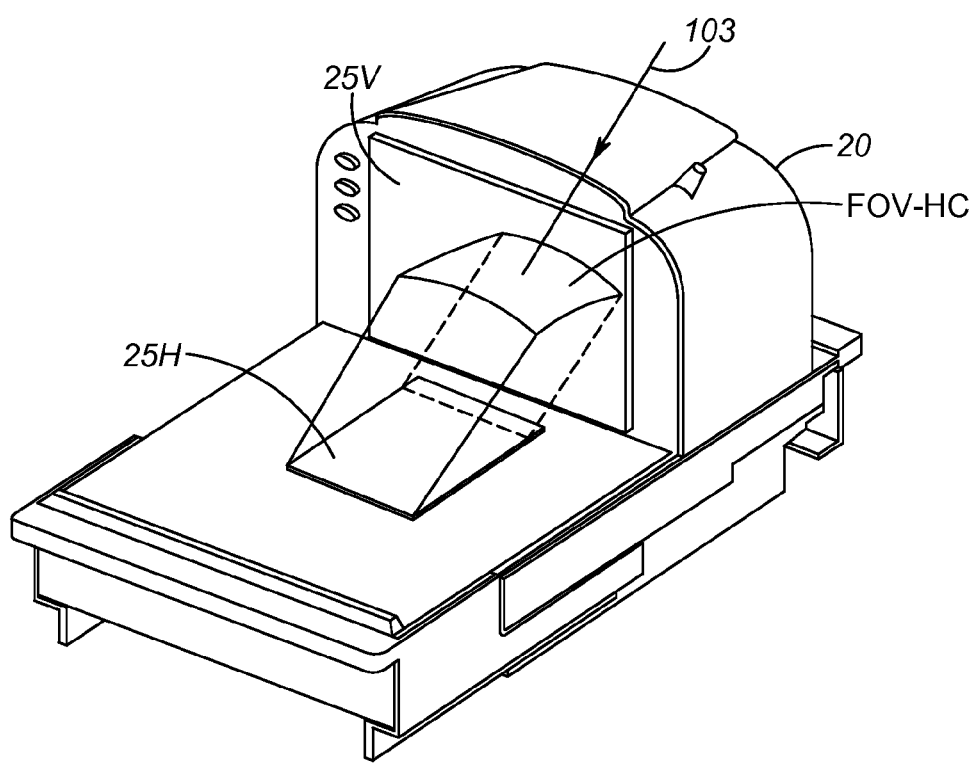

As shown in FIGS. 3A-3C, light ray 101 entering subfield FOV-HR, light ray 102 entering subfield FOV-HL, and light ray 103 entering subfield FOV-HC all pass through the horizontal window 25H and are detected by one or more solid-state imagers. In some implementations, more than one imaging scan engines 50 are used, and object light entering each one of the subfields (i.e. subfield FOV-HR, subfield FOV-HL, and subfield FOV-HC) is detected by one of the solid-state imagers. In other implementations, a single solid-state imager is used, and light ray entering each one of the subfields (i.e. subfield FOV-HR, subfield FOV-HL, and subfield FOV-HC) are all detected by this single solid-state imager when the field of view of this ingle solid-state imager is spitted into three subfields with multiple mirrors.

Figure 3D:
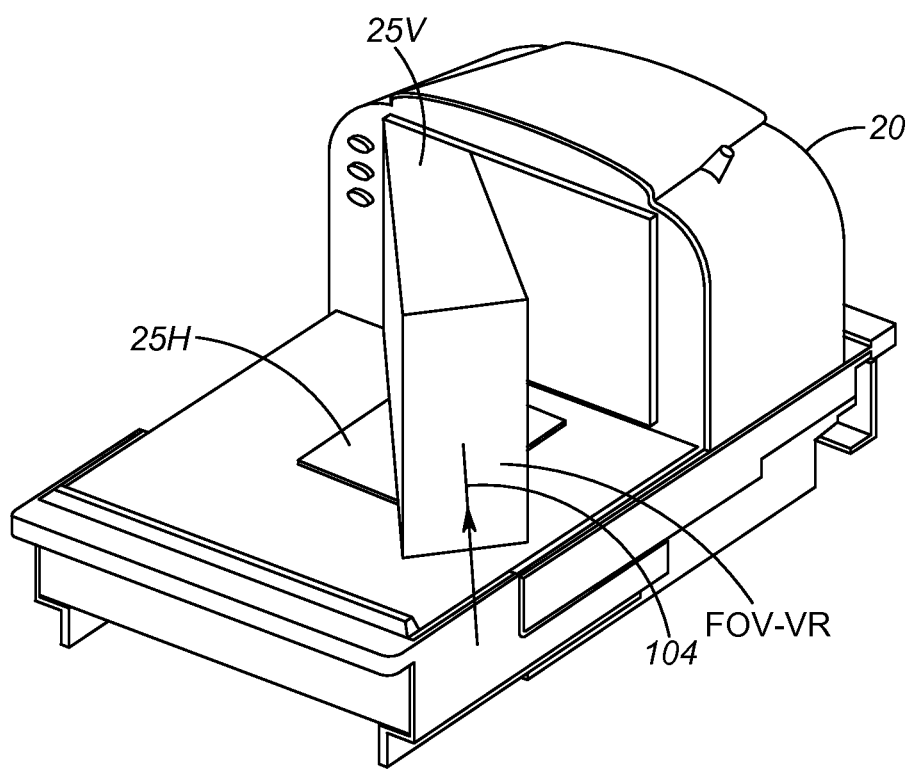
Figure 3E:
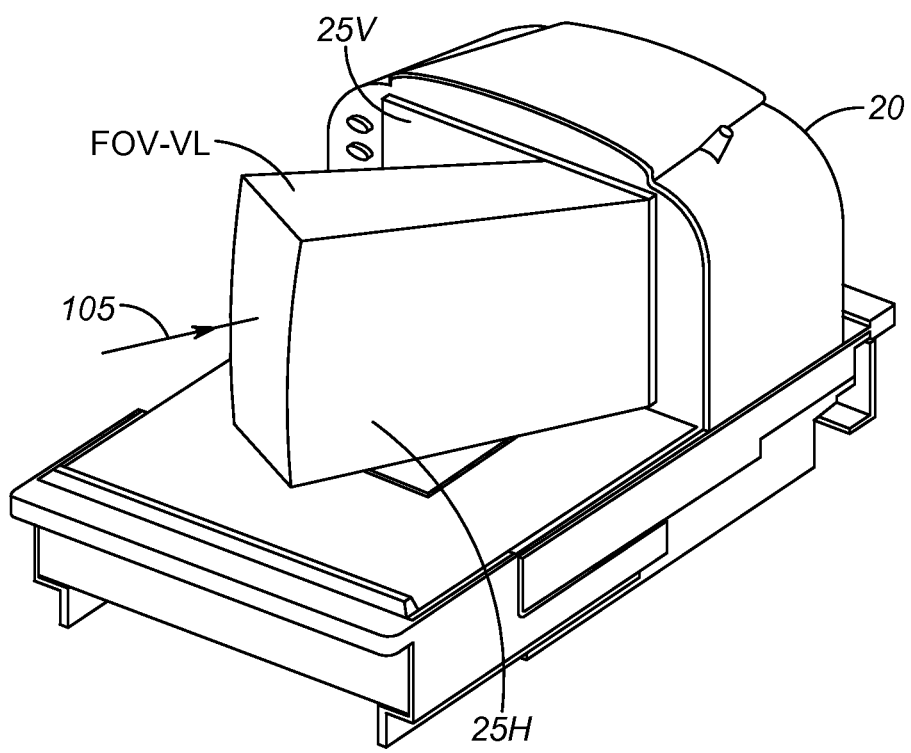
Figure 3F:
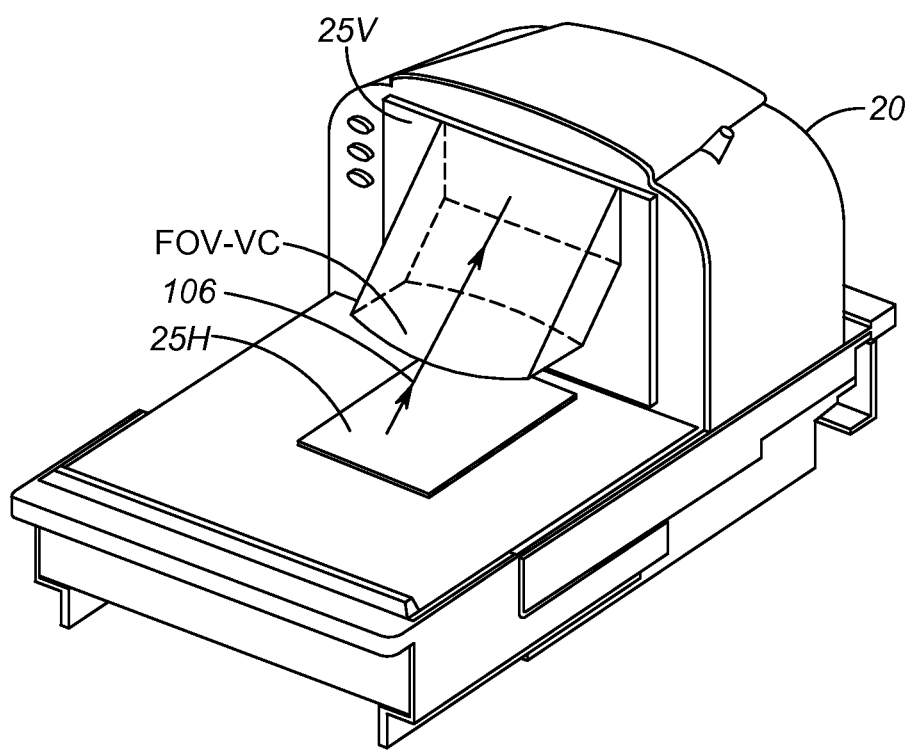

Similarly, As shown in FIGS. 3D-3F, light ray 104 entering subfield FOV-VR, light ray 105 entering subfield FOV-VL, and light ray 106 entering subfield FOV-VC all pass through the vertical window 25V and are detected by one or more solid-state imagers. In some implementations, three solid-state imagers are, and light ray entering each one of the subfields (i.e. subfield FOV-VR, subfield FOV-VL, and subfield FOV-VC) is detected by one of the solid-state imagers. In other implementations, a single solid-state imager is used, and light ray entering each one of the subfields (i.e. subfield FOV-VR, subfield FOV-VL, and subfield FOV-VC) are all detected by this ingle solid-state imager when the field of view of this single solid-state imager is spitted into three subfields with multiple mirrors.

Figure 4:
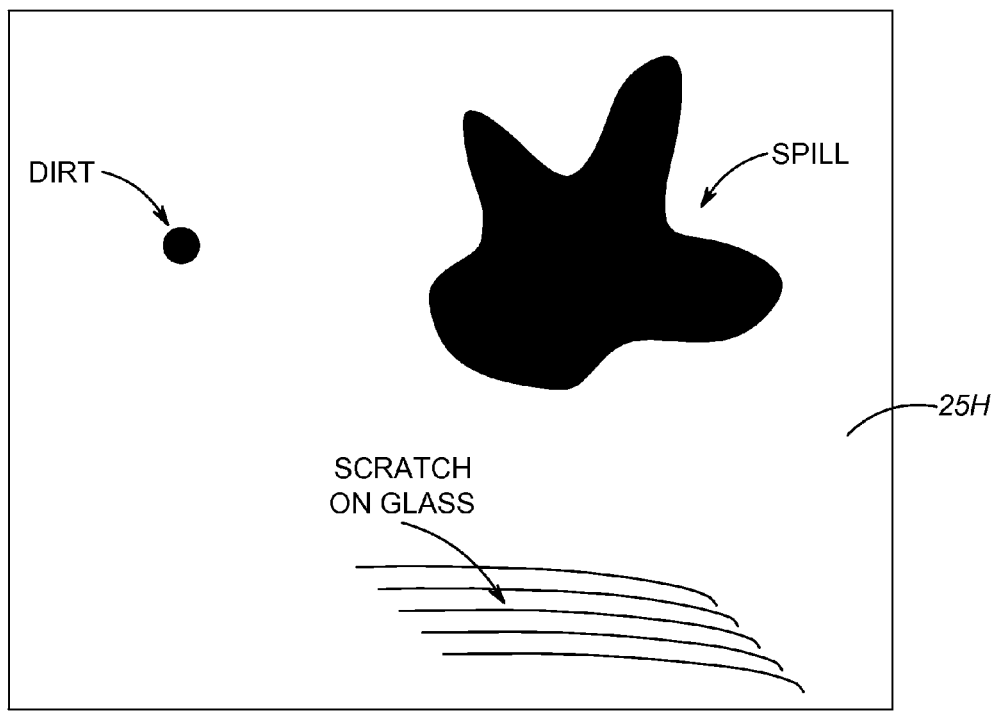
FIG. 4 is a schematic showing that the workstation of FIG. 1 can have a piece of dirt, a scratch mark, or a spill mark on its horizontal window in accordance with some embodiments.

When bi-optic workstations are used during check out, items are often swiped across the exit windows 25H and 25V. These items can be heavy, dirty, or wet, and one or more of the exit windows of a bi-optic workstation can get dirty, scratched or damaged. For example, as shown in FIG. 4, after a period of use, the workstation 10 of FIG. 1 can have a piece of dirt, a scratch mark, or a spill mark on the horizontal window 25H of the workstation. These additional features on the window can adversely affect the performance of this bi-optic workstation. There is often a need for constantly monitoring one or more of the exit windows of a bi-optic workstation.

Detecting the deterioration of an exit window requires some type of monitoring over time. In an imaging system, the monitoring can be performed by periodically taking images with the camera and comparing them. Since the view from the imaging device is unknown, it has been suggested that a known target be placed in front of the imager to fix the context in the monitoring image. This requires some user action and is therefore not automatic. It is desirable to have a method for automatically detecting the deterioration of an exit window over time. This allows the system to signal when attention needs to be paid to the window; either cleaning or replacement.

The disclosure describes a method that takes images with a very short exposure but with the imager's internal illumination switched on. If the exposure is short enough, only objects close to the exit window, such as damage on the window, will be visible in the image. This allows the imager to take monitoring images without the need of a reference target. Analyzing the sequence of monitoring images can be used to track the deterioration of the exit window. It can also be used to determine the type of window damage and suggest a remedy. For example, small focused dots may represent dirt on the window, while big blobs suggest a spillage. Broad streaks across the window suggest permanent damage and window replacement is suggested. Monitoring images can be captured at a specified time of day, or when the device has been idle for a long time.

Figure 5:
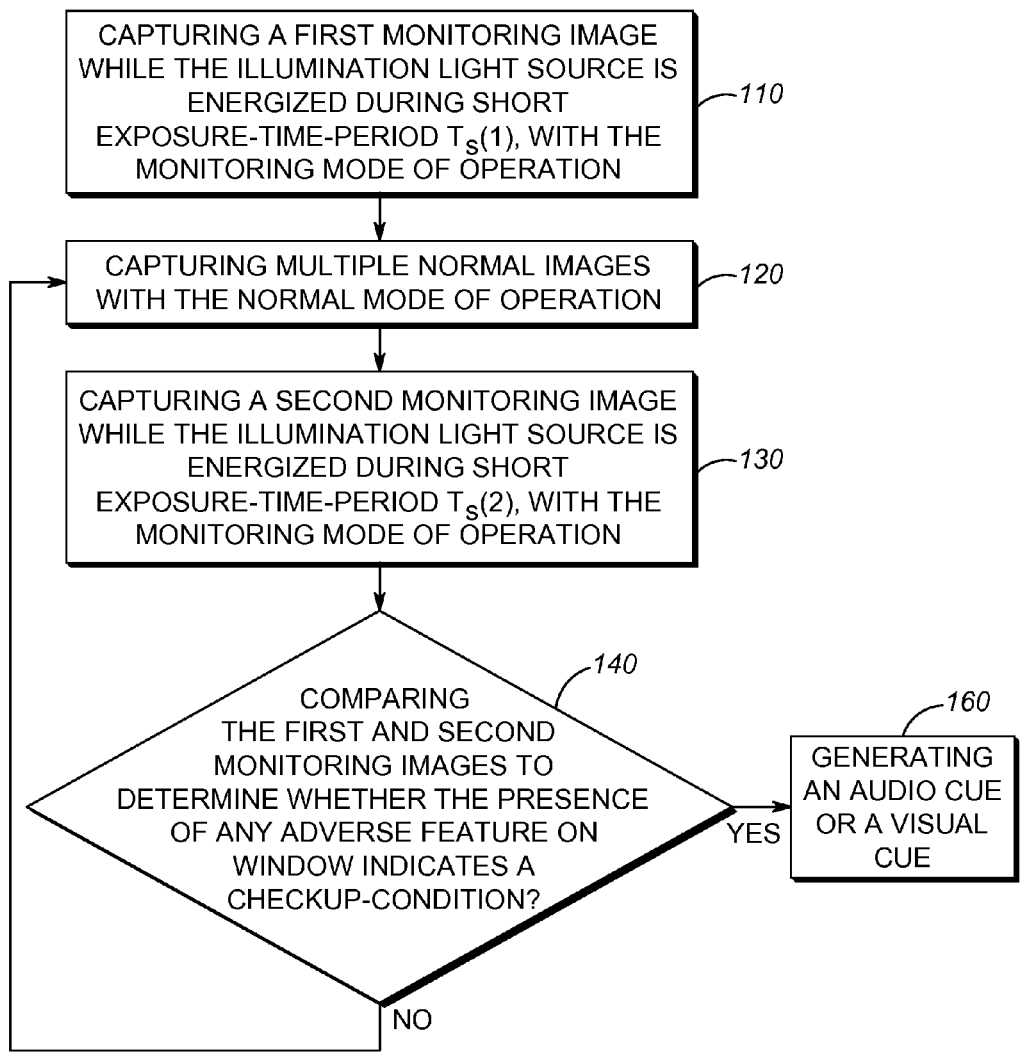
FIG. 5 is a flowchart of a method for automatically detecting the deterioration of an exit window over time in accordance with some embodiments.

FIG. 5 is a flowchart of a method 100 for automatically detecting the deterioration of an exit window over time in accordance with some embodiments. With the method 100, a first monitoring image is captured while the illumination light source is energized during short exposure-time-period $T_s(1)$ with the monitoring mode of operation (See, reference numeral 110). Then, multiple normal images are captured with the normal mode of operation (See, reference numeral 120). Some of the barcodes in these multiple normal images are successfully decoded during normal checkout process. At some later time, the deterioration of one or more exit window needs to be checked, and a second monitoring image is captured while the illumination light source is energized during short exposure-time-period $T_s(2)$ with the monitoring mode of operation (See, reference numeral 130). The first and second monitoring images are compared to determine whether the presence of any adverse feature on the window indicates a checkup-condition (See, reference numeral 140). If no adverse feature is found on the window, the workstation can continue normal operation, more normal images can be captured with the normal mode of operation (See, reference numeral 120). On the other hand, however, if some adverse feature on the window indicates a checkup-condition, some audio cue or visual cue can be generated to alert the operator (See, reference numeral 160).

During the process of the first and second monitoring images, each of the short exposure-time-period $T_s(1)$ and $T_s(2)$ is shorter than $4T_{th}$ but no shorter than $0.25\ T_{th}$, wherein $T_{th}$ is the threshold exposure-time-period. Here, the threshold exposure-time-period $T_{th}$ is a minimal exposure-time-period needed for the imaging sensor to capture recognizable patterns of a barcode that is in directing contacting with the exit window while the illumination light source is energized. In one example, such barcode can be provided by a black-and-white high contrast barcode printed on a paper facing the window and in direct contact with the window.

In some other implementations, each of the short exposure-time-period $T_s(1)$ and $T_s(2)$ can be within a range between $T_{th}$ to $2T_{th}$. In some other implementations, each of the short exposure-time-period $T_s(1)$ and $T_s(2)$ can be within a range between $T_{th}$ to $1.5T_{th}$. In some other implementations, each of the short exposure-time-period $T_s(1)$ and $T_s(2)$ can be within a range between $T_{th}$ to $1.2T_{th}$.

In some implementations, more than two monitoring images can be captured and then are analyzed or compared for determining whether the presence of any adverse feature on the window indicates a checkup-condition (See, reference numeral 140). The adverse feature on the window can be a piece of dirt, a scratch mark, a spill mark, or other type of damages. If some adverse feature on the window is found to indicate a checkup-condition, the workstation can generate some audio cue or visual cue to alert the operator (See, reference numeral 160). When the checkup-condition is detected, the workstation can also report the type of adverse feature, such as, window dirty, window scratched, or window damaged. There are also other variations for the method 100.

Figure 6:
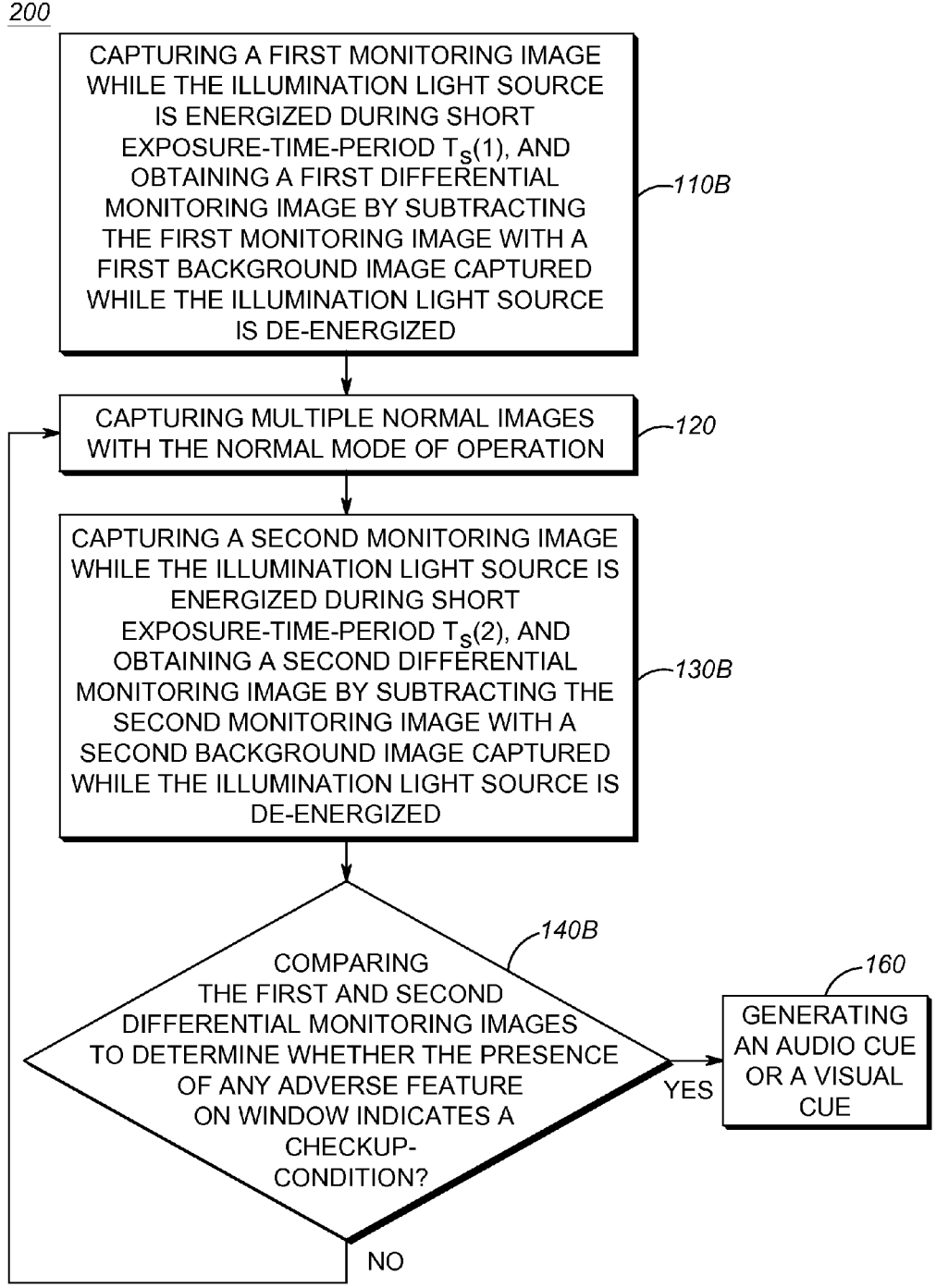
FIG. 6 is a flowchart of another method for automatically detecting the deterioration of an exit window over time in accordance with some embodiments.

FIG. 6 is a flowchart of a method 200 for automatically detecting the deterioration of an exit window over time in accordance with some embodiments. In the method 200, the first and second differential monitoring images are compared to determine whether the presence of any adverse feature on the window indicates a checkup-condition (See, reference numeral 140B). The first differential monitoring image is obtained by subtracting the first monitoring image with a first background image that is captured while the illumination light source is de-energized (See, reference numeral 110B). The second differential monitoring image is obtained by subtracting the second monitoring image with a second background image that is captured while the illumination light source is de-energized (See, reference numeral 130B). In some implementations, the first background image can be captured while the illumination light source is de-energized during a corresponding short exposure-time-period that is substantially identical to the short exposure-time-period $T_s(1)$. But, in other implementations, this corresponding short exposure-time-period can also be somewhat different from the short exposure-time-period $T_s(1)$. Similarly, in some implementations, the second background image can be captured while the illumination light source is de-energized during a corresponding short exposure-time-period that is substantially identical to the short exposure-time-period $T_s(2)$. This corresponding short exposure-time-period can also be somewhat different from the short exposure-time-period $T_s(2)$.

In the foregoing specification, specific embodiments have been described. However, one of ordinary skill in the art appreciates that various modifications and changes can be made without departing from the scope of the invention as set forth in the claims below. For example, while the object sensor can be implemented with an infrared light emitting diode and a photodetector, a solid-state imager can be used as the object sensor as well. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

What is claimed is:

1. A method of operating a workstation having an imaging sensor located within a housing that has a first window in an upright plane and a second window in a generally horizontal plane that intersects the upright plane, the workstation having two modes of operation including a barcode-scanning mode of operation and a monitoring mode of operation, the method comprising:
   projecting illumination light through one of the windows by energizing a illumination light source within the housing, intended for capturing at least one image with the imaging sensor;
   capturing multiple monitoring images each being captured with the imaging sensor while the illumination light source is energized during one of multiple monitoring exposure-time-periods associated with the monitoring mode of operation, wherein each of the multiple monitoring exposure-time-periods is below the threshold exposure-time-period, wherein the threshold exposure-time-period is an exposure-time-period that allows the imaging sensor to capture first patterns of a barcode with said first patterns being decodable when said barcode is in direct contact with said one of the windows while the illumination light source is energized, and wherein the threshold exposure-time-period is 110% of a sub-threshold exposure-time-period that allows the imaging sensor to capture second patterns of the barcode with said second patterns being undecodable when said barcode is in direct contact with said one of the windows while the illumination light source is energized; and
   detecting a checkup-condition including analyzing the multiple monitoring images to determine the presence of at least one image of an adverse feature that includes a piece of dirt, a scratch mark, and a spill mark on said one of the windows.

2. The method of claim 1, further comprising:
   generating at least one of an audio cue and a visual cue when the checkup-condition is detected.

3. The method of claim 1, further comprising:
   reporting a type of adverse feature when the checkup-condition is detected, the type of adverse feature including information about whether said one of the windows gets dirty, scratched or damaged.

4. The method of claim 1, wherein said detecting comprises:
   detecting the checkup-condition when at least one of the multiple monitoring images is sufficiently different from at least another one of the multiple monitoring images to indicate the presence of at least one image of an adverse feature.

5. The method of claim 1, further comprising:
obtaining multiple differential monitoring images that includes subtracting each of the multiple monitoring images by a corresponding background image associated therewith that is captured with the imaging sensor while the illumination light source is de-energized; and
detecting the checkup-condition when at least one of the multiple differential monitoring images is sufficiently different from at least another one of the multiple differential monitoring images to indicate the presence of at least one image of an adverse feature.

6. The method of claim 1, further comprising:
obtaining multiple differential monitoring images that includes subtracting each of the multiple monitoring images by a corresponding background image associated therewith that is captured with the imaging sensor while the illumination light source is de-energized during a corresponding identical short exposure-time-period associated therewith; and
detecting the checkup-condition when at least one of the multiple differential monitoring images is sufficiently different from at least another one of the multiple differential monitoring images to indicate the presence of at least one image of an adverse feature.

7. The method of claim 1, further comprising:
capturing multiple normal images each being captured with the imaging sensor while the illumination light source is energized during one of multiple exposure-time-periods associated with the barcode-scanning mode of operation, wherein each normal image capturing an object outside the housing and having at least one barcode therein that is successfully decodable; and
wherein said at least one of the multiple monitoring images is captured before the capturing of the multiple normal images, and said at least another one of the multiple monitoring images after the capturing of the multiple normal images.

8. A workstation comprising:
a housing having a first window in an upright plane and a second window in a generally horizontal plane that intersects the upright plane;
an imaging sensor within the housing and having an array of photosensitive elements;
an illumination system having an illumination light source within the housing and configured for projecting illumination light through one of the windows when the illumination light source is energized;
a controller operatively connected to the imaging sensor and the illumination system for controlling the workstation in a barcode-scanning mode of operation and a monitoring mode of operation, and configured for capturing multiple monitoring images each being captured with the imaging sensor while the illumination light source is energized during one of multiple monitoring exposure-time-periods associated with the monitoring mode of operation, wherein each of the multiple monitoring exposure-time-periods is below the threshold exposure-time-period, wherein the threshold exposure-time-period is an exposure-time-period that allows the imaging sensor to capture first patterns of a barcode with said first patterns being decodable when said barcode is in direct contact with said one of the windows while the illumination light source is energized, and wherein the threshold exposure-time-period is 110% of a sub-threshold exposure-time-period that allows the imaging sensor to capture second patterns of the barcode with said second patterns being undecodable when said barcode is in direct contact with said one of the windows while the illumination light source is energized; and
wherein the controller is further configured for detecting a checkup-condition including analyzing the multiple monitoring images to determine the presence of at least one image of an adverse feature that includes a piece of dirt, a scratch mark, and a spill mark on said one of the windows.

9. The workstation of claim 8, wherein the controller is further configured to generate at least one of an audio cue and a visual cue when the checkup-condition is detected.

10. The workstation of claim 8, wherein the controller is further configured to report a type of adverse feature when the checkup-condition is detected, the type of adverse feature including information about whether said one of the windows gets dirty, scratched or damaged.

11. The workstation of claim 8, wherein said detecting comprising:
detecting the checkup-condition when at least one of the multiple monitoring images is sufficiently different from at least another one of the multiple monitoring images to indicate the presence of at least one image of an adverse feature.

12. The workstation of claim 8, wherein the controller is further configured for
obtaining multiple differential monitoring images that includes subtracting each of the multiple monitoring images by a corresponding background image associated therewith that is captured with the imaging sensor while the illumination light source is de-energized; and
wherein said detecting comprises detecting the checkup-condition when at least one of the differential multiple monitoring images is sufficiently different from at least another one of the differential multiple monitoring images to indicate the presence of at least one image of an adverse feature.

13. The workstation of claim 8, wherein the controller is further configured for
obtaining multiple differential monitoring images that includes subtracting each of the multiple monitoring images by a corresponding background image associated therewith that is captured with the imaging sensor while the illumination light source is de-energized during a corresponding identical short exposure-time-period associated therewith; and
wherein said detecting comprises detecting the checkup-condition when at least one of the differential multiple monitoring images is sufficiently different from at least another one of the differential multiple monitoring images to indicate the presence of at least one image of an adverse feature.

14. A method of operating a workstation having an imaging sensor located within a housing that has a first window in an upright plane and a second window in a generally horizontal plane that intersects the upright plane, the workstation having two modes of operation including a barcode-scanning mode of operation and a monitoring mode of operation, the method comprising:
projecting illumination light through one of the windows by energizing a illumination light source within the housing, intended for capturing at least one image with the imaging sensor;
capturing multiple monitoring images each being captured with the imaging sensor while the illumination light source is energized during one of multiple monitoring exposure-time-periods associated with the monitoring mode of operation, wherein each of the multiple monitoring exposure-time-periods is below the threshold exposure-time-period, wherein the threshold exposure-time-period is an exposure-time-period that allows the imaging sensor to capture first patterns of a barcode with said first patterns being decodable when said barcode is in direct contact with said one of the windows while the illumination light source is energized, and wherein the threshold exposure-time-period is 110% of a sub-threshold exposure-time-period that allows the imaging sensor to capture second patterns of the barcode with said second patterns being undecodable when said barcode is in direct contact with said one of the windows while the illumination light source is energized; and detecting a checkup-condition when at least one monitoring image differ from multiple other monitoring images with one or more additional image feature.

* * * * *